US012561189B2

(12) United States Patent　　　　(10) Patent No.:　US 12,561,189 B2
Nakajima　　　　　　　　　　　　　　(45) Date of Patent:　Feb. 24, 2026

(54) MANAGEMENT SYSTEM AND MANAGEMENT METHOD

(71) Applicant: Hitachi Vantara, Ltd., Kanagawa-ken (JP)

(72) Inventor: Jun Nakajima, Tokyo (JP)

(73) Assignee: Hitachi Vantara, Ltd., Kanagawa-ken (JP)

( * ) Notice: Subject to any disclaimer, the term of this patent is extended or adjusted under 35 U.S.C. 154(b) by 0 days.

(21) Appl. No.: 18/815,375

(22) Filed: Aug. 26, 2024

(65) Prior Publication Data

US 2025/0173210 A1　May 29, 2025

(30) Foreign Application Priority Data

Nov. 29, 2023　(JP) ................................. 2023-202116

(51) Int. Cl.
　　*G06F 11/07*　　　　(2006.01)
(52) U.S. Cl.
　　CPC ...... *G06F 11/0781* (2013.01); *G06F 11/0772* (2013.01); *G06F 11/0793* (2013.01)
(58) Field of Classification Search
　　CPC ............. G06F 11/0781; G06F 11/0772; G06F 11/0793
　　USPC .................................................... 714/48, 15
　　See application file for complete search history.

(56) References Cited

U.S. PATENT DOCUMENTS

| | | | |
|---|---|---|---|
| 2008/0189534 A1* | 8/2008 | Jeng ..................... | G06Q 10/067 |
| | | | 712/E9.032 |
| 2008/0223918 A1* | 9/2008 | Williams ............... | G06Q 20/20 |
| | | | 235/379 |
| 2009/0030863 A1* | 1/2009 | Stanfill .................. | G06N 20/00 |
| | | | 706/45 |
| 2015/0163179 A1* | 6/2015 | Maes ................. | G06Q 30/0276 |
| | | | 709/206 |
| 2015/0378809 A1* | 12/2015 | Bhaumik ............... | G06Q 10/06 |
| | | | 714/15 |
| 2016/0154692 A1* | 6/2016 | Heinz ................. | G06F 11/0772 |
| | | | 714/2 |
| 2019/0347168 A1* | 11/2019 | Giannetti ............ | G06F 11/1438 |
| 2020/0351392 A1* | 11/2020 | Bomma .................. | H04L 67/60 |
| 2020/0396343 A1* | 12/2020 | Hayashi ............ | H04N 1/00037 |
| 2024/0211303 A1* | 6/2024 | Yoshikawa ........... | G06F 9/4881 |

FOREIGN PATENT DOCUMENTS

JP　　　　2015-170344 A　　　9/2015

* cited by examiner

*Primary Examiner* — Chae M Ko
(74) *Attorney, Agent, or Firm* — Procopio, Cory, Hargreaves & Savitch LLP

(57)　　　　　ABSTRACT

A management system manages one or more infrastructures, and a processor of the management system executes a plurality of consecutive processes on the infrastructure in response to a request, determines whether an error occurs during execution of the plurality of consecutive processes, selects a handling based on at least one of a classification of the error, an execution status of the processes, and a preset handling start condition when the error occurs, and executes the selected handling.

7 Claims, 9 Drawing Sheets

COMPUTER

201

PROCESSOR

202

STORAGE DEVICE

206

INPUT DEVICE

OUTPUT DEVICE

COMMUNICATION I/F

| REQUEST | EXECUTION TYPE | TARGET | PROCESS | PROCESS CLASSIFICATION |
|---|---|---|---|---|
| Allocate Volume | NORMAL | Storage | SERVER CREATION | Create |
| | | | HOST WWN SETTING | Create |
| | | | VOLUME CREATION | Create |
| | | | PATH SETTING | Create |
| | | | VOLUME SERVER SETTING | Create |
| | ROLLBACK | Storage | VOLUME SERVER SETTING | Delete |
| | | | PATH SETTING | Delete |
| | | | VOLUME DELETION | Delete |
| | | | HOST WWN SETTING | Delete |
| | | | SERVER DELETION | Delete |
| Change Assigned Volume | NORMAL EXECUTION | SDS | VOLUME SETTING CHANGE | Update |
| | | | VOLUME SERVER SETTING | Update |
| | ROLLBACK | SDS | VOLUME SERVER SETTING | Update |
| | | | VOLUME SETTING CHANGE | Update |
| Config Cloud Backup | NORMAL EXECUTION | Storage | VOLUME CREATION | Create |
| | | SDS | VOLUME CREATION | Create |
| | | Storage | PAIR SETTING | Create |
| | ROLLBACK | Storage | PAIR SETTING | Delete |
| | | SDS | VOLUME DELETION | Delete |
| | | Storage | VOLUME DELETION | Delete |

| ID 501 | REQUEST 502 | STATUS 503 | ERROR TYPE 504 | TARGET SYSTEM 505 | PROCESS NUMBER 506 | CORRE-SPONDING PROCESS NUMBER 507 | PROCESS 508 | PROCESS STATUS 509 | PROCESS COUNT 510 |
|---|---|---|---|---|---|---|---|---|---|
| 123 | Allocate Volume | Failed | RESOURCE (SERVER) IS BEING USED IN ANOTHER SESSION | Storage 1 | P1 | - | SERVER CREATION (5) | Success | 1 |
|  |  |  |  |  | P2 | - | HOST WWN SETTING (7280ccecccc0) | Success | 1 |
|  |  |  |  |  | P3 | - | VOLUME CREATION (30104) | Success | 2 |
|  |  |  |  |  | P4 | - | PATH SETTING (7280ccecccc0, CL1-A) | Success | 1 |
|  |  |  |  |  | P5 | - | VOLUME SERVER SETTING (5, 30104) | Failed | 1 |
|  |  |  |  |  | R1 | P5 | VOLUME SERVER SETTING (5, 30104) | Not Executed | - |
|  |  |  |  |  | R2 | P4 | PATH SETTING (7280ccecccc0, CL1-A) | Success | 1 |
|  |  |  |  |  | R3 | P3 | VOLUME DELETION (30104) | Success | 1 |
|  |  |  |  |  | R4 | P2 | HOST WWN SETTING (7280ccecccc0) | Success | 1 |
|  |  |  |  |  | R5 | P1 | SERVER DELETION (5) | Success | 1 |
| 124 | Update Assigned Volume | Failed | STORAGE INTERNAL ERROR | SDS 1 | P1 | - | VOLUME SETTING CHANGE (30104) ("CAPACITY", "100 GB", "1 TB") | Success | 1 |
|  |  |  |  |  | P2 | - | VOLUME SERVER SETTING (6, 30104) | Failed | 1 |
|  |  |  |  |  | R1 | P2 | VOLUME SERVER SETTING (6, 30104) | Not Executed | - |
|  |  |  |  |  | R2 | P1 | VOLUME SETTING CHANGE (30104) ("CAPACITY", "1 TB", "100 GB") | Not Executed | - |
| 125 | Config Remote Backup | Failed | COMMUNICATION OF REMOTE CONNECTIONPORT IS NOT AVAILABLE | Storage1 | P1 |  | VOLUME CREATION (51000) | Success | 3 |
|  |  |  |  | SDS1 | P2 |  | VOLUME CREATION (90) | Success | 1 |
|  |  |  |  | Storage1 | P3 |  | PAIR SETTING (30) | Failed | 1 |
| ... | ... | ... | ... | ... | ... | ... | ... | ... | ... |

| ERROR CODE 601 | ERROR CLASSIFICATION 602 | HANDLING START CONDITION 603 |
|---|---|---|
| OPERATION_TIMEOUT | TEMPORARILY | CPU < 100% TRIAL COUNT < 3 |
| TOO_MANY_REQUESTS | TEMPORARILY | Resource Unlocked WAIT TIME: 3 min TRIAL COUNT < 4 |
| CONFIG_INCONSISTENCY | TEMPORARY, INCONSISTENT WITH CONFIGURATION | REFRESH TRIAL COUNT < 2 |
| PORT_BLOCKING | INTERNAL | - |

| PROCESS | TARGET TYPE | UNIT PROCESS TIME | UNIT VALUE | CALCULATION FORMULA |
|---|---|---|---|---|
| 701 | 702 | 703 | 704 | 705 |
| VOLUME CREATION | Storage | 300s | 1GB | CAPACITY (GB) × UNIT PROCESS TIME × NUMBER |
| VOLUME CREATION | SDS | 1000s | 1GB | CAPACITY (GB) × UNIT PROCESS TIME × CEIL (NUMBER/10) |
| PATH SETTING | Storage | 30s | — | PROCESS TIME × NUMBER × 1.1 |

Figure 10:
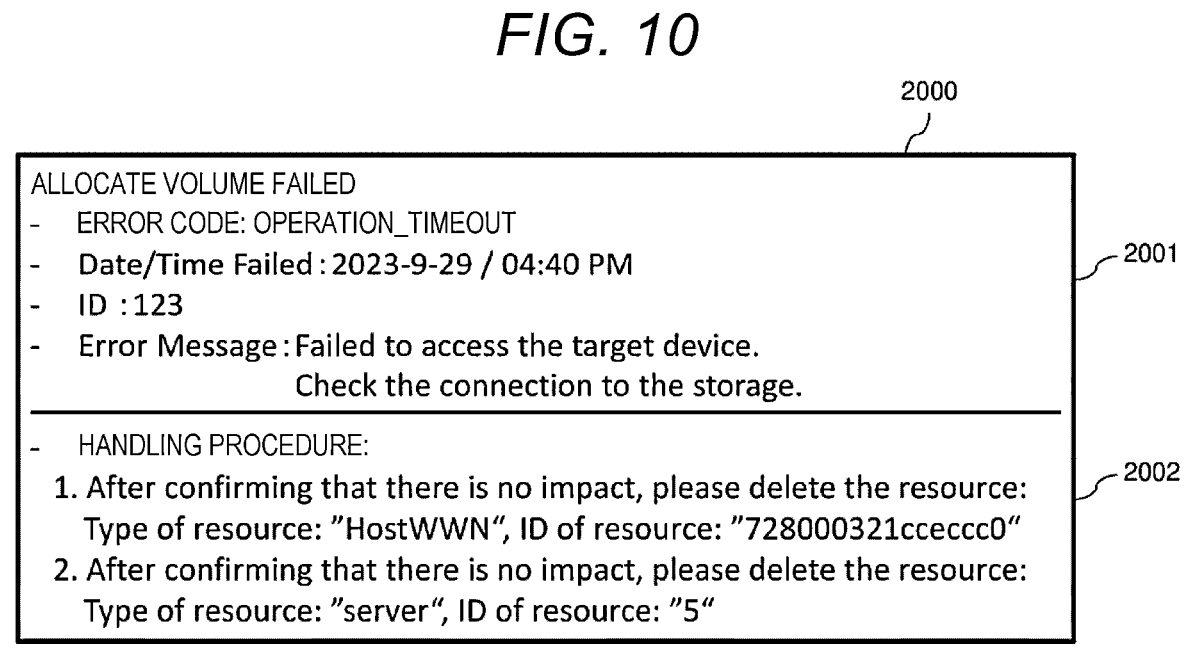

ALLOCATE VOLUME FAILED
- ERROR CODE: OPERATION_TIMEOUT
- Date/Time Failed : 2023-9-29 / 04:40 PM
- ID : 123
- Error Message : Failed to access the target device.
                  Check the connection to the storage.

2001

- HANDLING PROCEDURE:
  1. After confirming that there is no impact, please delete the resource:
     Type of resource: "HostWWN", ID of resource: "728000321cceccc0"
  2. After confirming that there is no impact, please delete the resource:
     Type of resource: "server", ID of resource: "5"

2002

MANAGEMENT SYSTEM AND MANAGEMENT METHOD

CROSS REFERENCE TO RELATED APPLICATIONS

This application claims priority to Japanese Patent Application No. 2023-202116, filed Nov. 29, 2023, the contents of which are incorporated herein by reference in its entirety for all purposes.

BACKGROUND OF THE INVENTION

1. Field of the Invention

The present invention relates to a management system and a management method.

2. Description of Related Art

In operation management of an IT infrastructure, an operation form in which an administrator who manages the entire IT infrastructure manages a storage without setting an administrator who is dedicated to the storage is often used. Therefore, there is a demand for storage management in which a general administrator with poor knowledge and skill for storage can easily perform an operation with less labor.

In addition, as use of a public cloud by a customer progresses, there is an increasing expectation for a service (management service) that centrally manages a service providing system that provides a storage system in a customer data center and a service providing system that provides software defined storage (SDS) operating on the public cloud.

Therefore, a Software-as-a-Service (Saas) type management service which operates on the public cloud or the like and which is managed by a storage management vendor appears, and a function or the like of easily introducing additional hardware such as a management server or the like without the need for a customer to prepare the additional hardware and performing storage volume provisioning (capacity allocation) is provided.

In a management service provided for a general administrator, it is often to reduce management labor by preparing a layer that abstracts a management API (lower API) requiring detailed knowledge for the storage, and providing a mechanism in which a plurality of lower APIs are executed internally by executing one abstract API (upper API). At this time, when a process fails during the execution of the upper API, it is necessary to handle an upper API execution state during the process in addition to handling the cause of the failure.

In response to this, for example, PTL 1 is known as a technique of automatically handling a failure in a process in a management service. In PTL 1, when a process of creating a plurality of resources executed in response to one execution request fails during the process, a rollback is automatically performed in order to restore the plurality of resources for which the process has failed to an original state. In addition, when a deletion process on a plurality of resources fails during the process, the process is automatically retried and rolled forward.

CITATION LIST

Patent Literature

PTL 1: JP2015-170344A

SUMMARY OF THE INVENTION

In the technique of PTL 1, when the automatic handling is successful, it is possible to handle the execution state during the process, whereas when the automatic handling fails, in addition to the failure that occurs first, a failure as a result of performing the automatic handling also occurs, a plurality of problems occur, and handling the cause of the failure becomes complicated.

Further, even when the automatic handling performed by using the rollback is successful, there is a case where a time for returning an operation successful in the process to the state before the execution is long, and it takes time to complete the management operation.

Accordingly, an object of the invention is to provide a technique capable of optimizing a time to complete a management operation.

In order to solve the above problem, one representative management system according to the invention is a management system that manages one or more infrastructures, and the management system includes: a processor. The processor executes a plurality of consecutive processes on the infrastructure in response to a request, determines whether an error occurs during execution of the plurality of consecutive processes, selects a handling based on at least one of a classification of the error, an execution status of the processes, and a preset handling start condition when the error occurs, and executes the selected handling.

According to the invention, it is possible to optimize a time to complete a management operation. The problems, configurations, and effects other than those described above will become apparent in the following description of embodiments.

BRIEF DESCRIPTION OF THE DRAWINGS

FIG. 2 is a block diagram showing an example of a hardware structure of a computer constituting the management system according to Embodiment 1;

FIG. 4 is a diagram showing an example of a data structure of request-process correspondence information according to Embodiment 1;

FIG. 5 is a diagram showing an example of a data structure of execution status management information according to Embodiment 1;

FIG. 6 is a diagram showing an example of a data structure of error handling type information according to Embodiment 1;

FIG. 7 is a diagram showing an example of a data structure of process time information according to Embodiment 1;

FIG. 10 is a diagram showing an example of an error handling display screen presented by the management system according to Embodiment 1.

DESCRIPTION OF EMBODIMENTS

Hereinafter, an embodiment of the invention will be described with reference to the drawings. However, the invention is not to be construed as being limited to the description of the following embodiment. It will be easily understood by those skilled in the art that the specific configuration can be changed without departing from the spirit or scope of the invention. In the configurations of the invention to be described below, the same or similar configurations or functions are denoted by the same reference signs, and a redundant description will be omitted. The notations "first", "second", "third", and the like in the present specification are provided to identify components and do not necessarily limit the number or the order.

Embodiment 1

Figure 1:
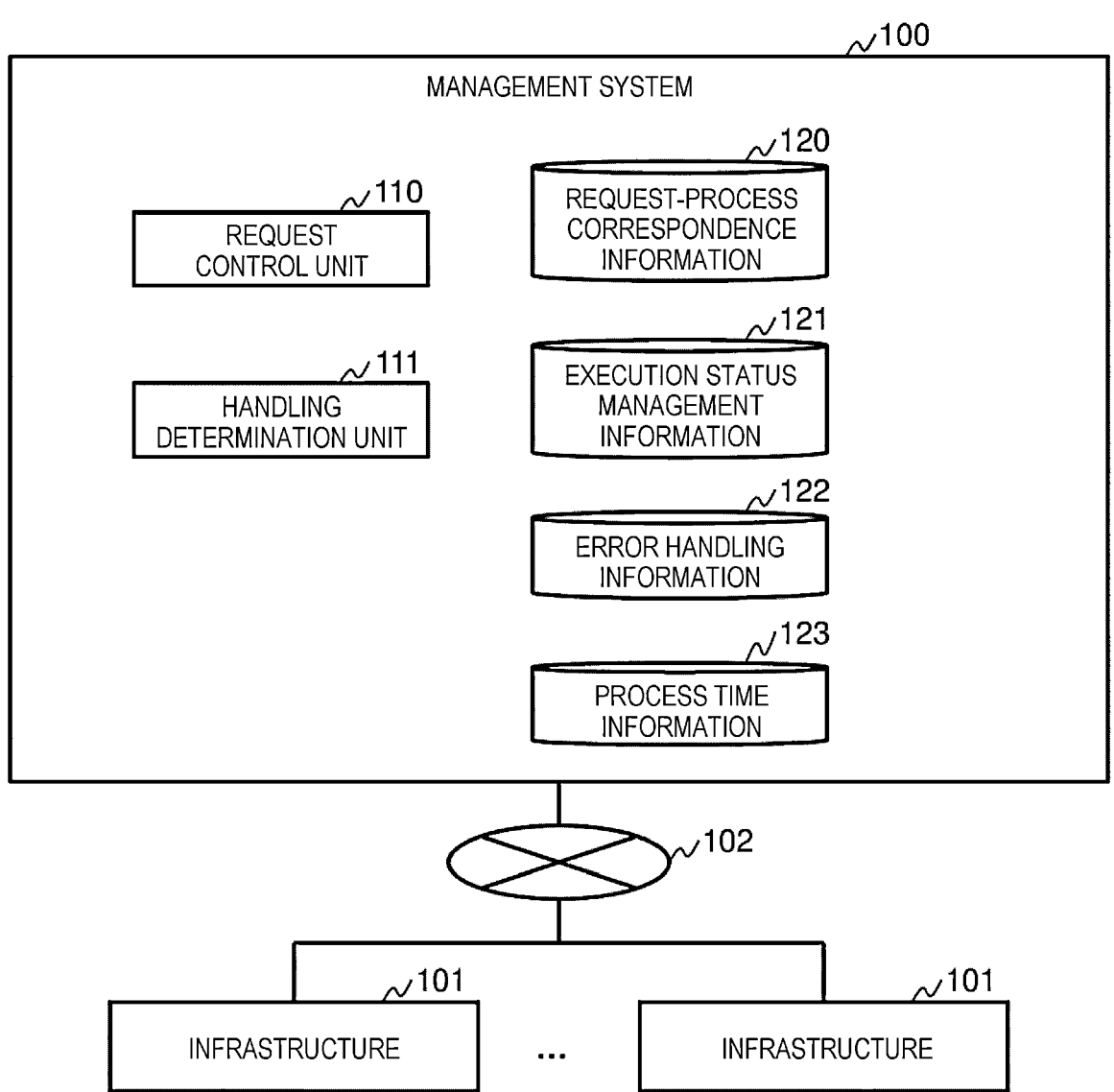
FIG. 1 is a block diagram showing an example of a configuration of a system to which a management system according to Embodiment 1 is applied.

FIG. 1 is a block diagram showing an example of a configuration of a system to which a management system according to Embodiment 1 is applied.

The system to which the management system according to Embodiment 1 is applied includes a management system 100 and a plurality of infrastructures 101.

The management system 100 is connected to the plurality of infrastructures 101 via a network 102 such as a wide area network (WAN), a local area network (LAN), and a storage area network (SAN).

The infrastructure 101 provides an environment for constructing a service providing system that provides a service.

The infrastructure 101 may be any one of an on-premises infrastructure and a cloud infrastructure. The service providing system may be implemented by a physical element such as a computer, or may be implemented by a virtual element such as a virtual computer.

The management system 100 centrally manages the service providing systems constructed on the infrastructures 101.

The management system 100 includes a request control unit 110 and a handling determination unit 111, and stores request-process correspondence information 120, execution status management information 121, error handling information 122, and process time information 123.

The request-process correspondence information 120 is information for managing a correspondence between a request to the infrastructure 101 requested by the management system 100 and a process provided by the infrastructure 101.

The execution status management information 121 is information for managing an execution status of the request to the infrastructure 101 requested by the management system 100.

The error handling information 122 is information for managing an error that may occur in the infrastructure 101 and a handling for the error.

The process time information 123 is information for managing a process on the infrastructure 101 and a time taken for the process.

The management system 100 may be included in any one of the infrastructures 101.

Figure 2:
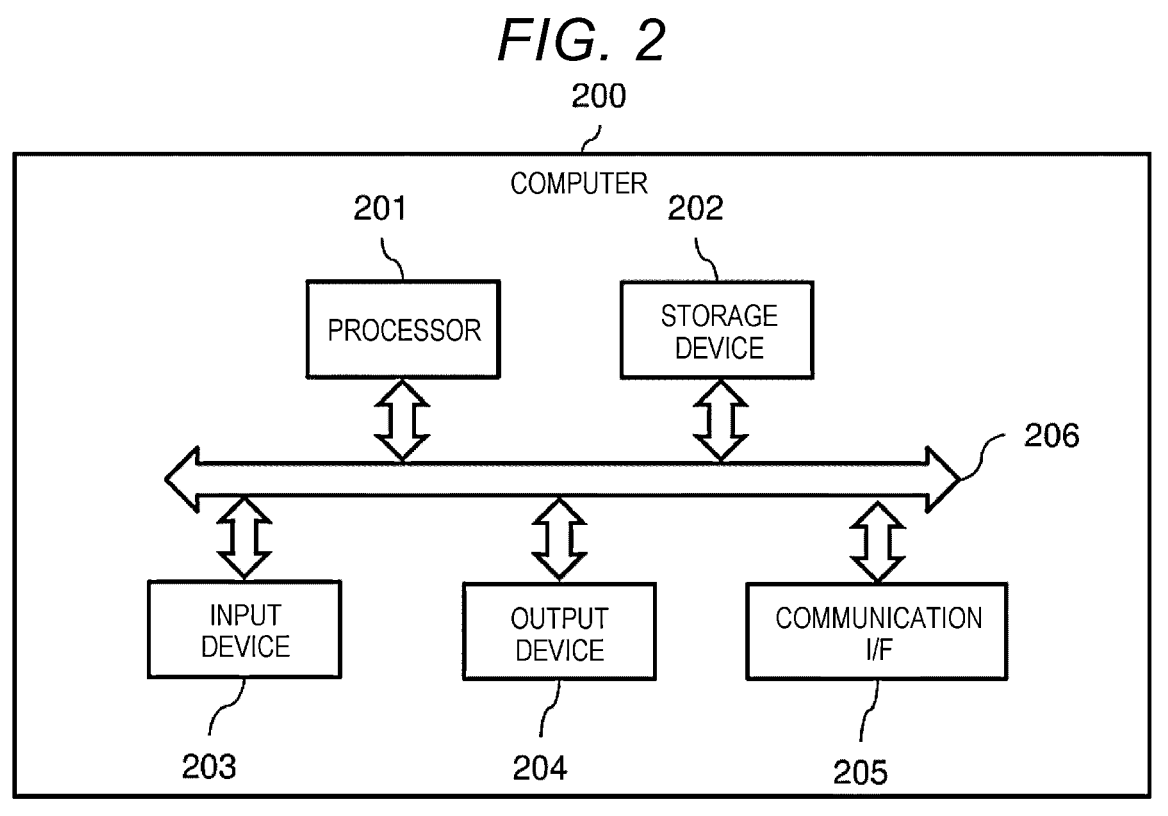

The management system 100 includes, for example, a computer 200 shown in FIG. 2.

FIG. 2 is a block diagram showing an example of a hardware structure of a computer constituting the management system 100 according to Embodiment 1.

A hardware structure example of the computer 200 that operates the request control unit 110 and the handling determination unit 111 shown in FIG. 1 is shown.

The computer 200 is a server or a computer implemented by mutually connecting a processor 201, a storage device 202, an input device 203, an output device 204, and a communication I/F 205 via a bus 206.

The processor 201 operates as a functional unit (module) that implements a specific function by executing a process according to a program stored in the storage device 202. In the following description, when a process is described with a functional unit as a subject, it indicates that the processor 201 executes a program for implementing the functional unit.

The storage device 202 is a main storage device used when the processor 201 executes a process, and is implemented by a volatile storage element such as a random access memory (RAM).

The input device 203 is an interface that receives an input from a user (operator), and is implemented by a keyboard, a touch panel, a card reader, an audio input device, and the like.

The output device 204 is an interface that outputs data to an operator, and is implemented by a display, a speaker, a printer, and the like.

The communication I/F 205 is an interface used for the computer 200 communicating with an external device, and is implemented by a network interface card (NIC) and the like. The communication I/F 205 is connected to the network 102, and communicates with the infrastructures 101 via the network 102.

The bus 206 is an internal communication path of the computer 200.

In the present embodiment, the management system 100 is executed on one or more computers 200 having the hardware structure as shown in FIG. 2, so that processes described later can be implemented.

The request-process correspondence information 120, the execution status management information 121, the error handling information 122, and the process time information 123 are stored in the storage device 202.

Figure 3:
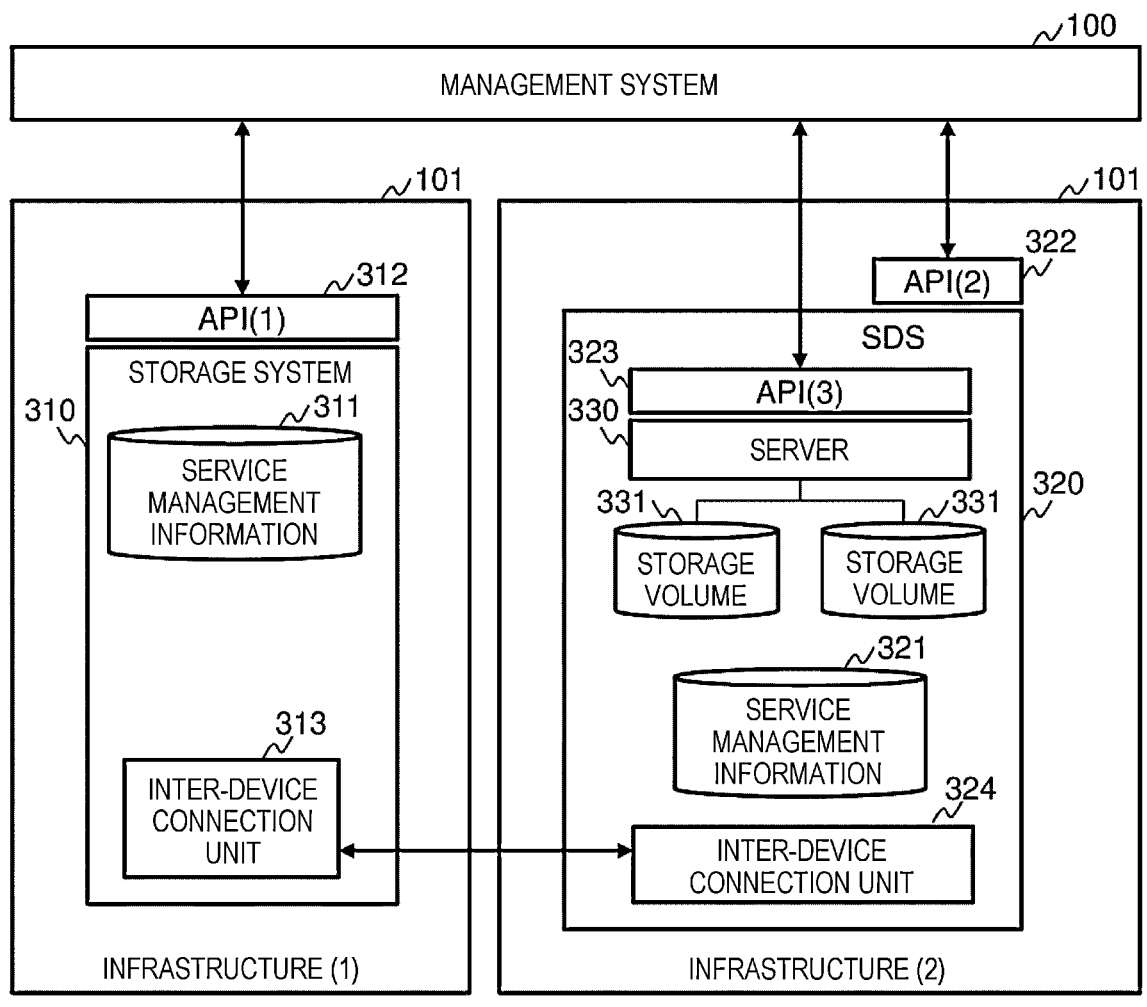
FIG. 3 is a block diagram showing an example of a configuration of an infrastructure according to Embodiment 1.

FIG. 3 is a block diagram showing an example of a configuration of the infrastructure 101 according to Embodiment 1.

An infrastructure (1) 101 is, for example, an on-premises infrastructure, and includes a storage system 310.

The storage system 310 is an example of the service providing system, and may be implemented by a server or the like. The storage system 310 provides volumes.

The storage system 310 stores service management information 311 that stores data related to performance and the like of the storage system 310.

In addition, the storage system 310 provides an API (1) 312 for the management system 100 to access.

In addition, the storage system 310 includes an inter-device connection unit 313 for exchanging data with another infrastructure.

The exchange of the data between the infrastructures is performed via the network 102, and is used, for example, for remote backup between volumes of the storage system.

An infrastructure (2) 101 is, for example, a cloud infrastructure, and includes a software defined storage (SDS) 320.

The SDS 320 is an example of the service providing system, and may be implemented by various services provided by the cloud infrastructure, a server, and the like. The SDS 320 provides volumes.

The SDS 320 includes a server 330 and one or more storage volumes 331.

The SDS 320 stores service management information 321 that stores data related to performance and the like of the SDS 320.

In addition, the SDS 320 provides an API (2) 322 for the management system 100 to access, and also provides an API (3) 323 for the management system 100 to access the server 330.

In addition, the SDS 320 includes an inter-device connection unit 324 for exchanging data with another infrastructure.

The infrastructures 101 and the systems on the infrastructures 101 shown in FIG. 3 are examples, and the invention is not limited thereto.

FIG. 4 is a diagram showing an example of a data structure of the request-process correspondence information 120 according to Embodiment 1.

The request-process correspondence information 120 stores an entry including a request 401, an execution type 402, a target 403, a process 404, and a process classification 405.

One request 401 is an entry in a format corresponding to a plurality of processes 404. In the request 401, request information for the infrastructure 101 requested by the management system 100 is stored. Here, the request information stores information that is provided by the management system 100 and that can uniquely specify a function using a service providing system of the infrastructure 101.

In the execution type 402, whether the process 404 is a type of "normal" process during normal execution or a type of "rollback" process during a rollback is stored.

In the target 403, a type of the service providing system in the infrastructure 101 that is an execution target of the process 404, for example, a storage system (storage) or an SDS, is stored.

In the process 404, information that can specify a process executed by a storage system, such as an API name provided by the API (1) 312 of the storage system 310, is stored.

In the process classification 405, information about whether the process 404 is classified into processes of Create, Update, or Delete is stored.

The request 401 in FIG. 4 shows, as an example, "Allocated Volume" for requesting volume provision of the storage system 310 of the infrastructure 101, "Change Assign Volume" for requesting changes in volume capacity and access information, and "Config Cloud Backup" for setting the remote backup between the infrastructures using the inter-device connection units 313 and 324 of the infrastructures 101.

The request 401 is not limited to the above example, and may be any function using the infrastructure 101 provided by the management system 100, such as a request for requesting cancellation of the volume provision of the storage system 310 or a request for requesting snapshot acquisition of the volumes of the storage system 310.

FIG. 5 is a diagram showing an example of a data structure of the execution status management information 121 according to Embodiment 1.

The execution status management information 121 stores an entry including an ID 501, a request 502, a status 503, an error type 504, a target system 505, a process number 506, a corresponding process number 507, a process 508, a process status 509, and a process count 510.

One request 502 is an entry in a format corresponding to a plurality of processes 508.

In the ID 501, an ID for uniquely identifying a request for the infrastructure 101 requested by the management system 100 is stored.

In the request 502, request information requested by the management system 100 is stored.

In the status 503, an execution status of the request is stored. For example, "Failed" is stored when the request is failed, "Success" is stored when the request is successful, and "Processing" is stored when the request is being executed.

When the request ends due to an error, for example, when the status 503 is "Failed", a content of the error occurred is stored in the error type 504.

The target system 505 stores an identifier indicating a service providing system in the infrastructure 101 that is a target for executing a request, and indicates a service as a target for executing the process 508.

In the process number 506, an execution sequential order assigned to the process 508 executed for the request 502 is stored. For example, in an example in FIG. 5, for a request referred to as "Allocate Volume", P1 (Process number 1) is assigned to a "Server Creation" process which is a normal process to be executed first, and P2 (Process number 2) is assigned to "Host WWN Setting" which is a normal process to be executed second.

Further, R1 (Rollback number 1) is assigned to "Volume Server Setting" which is a rollback process that can be executed first, and R2 (Rollback number 2) is assigned to "Path Setting" which is a rollback process that can be executed second.

The corresponding process number 507 is set only for the rollback process, in which a process number of a normal process of performing a rollback in the rollback process is stored. For example, the corresponding process number P1 is stored in an entry in which the process number 506 is R5, and this indicates that a process "Server Deletion" in which the process number 506 is R5 is a rollback process of the process "Server Creation" in which the corresponding process number 507 is P1.

In the process 508, a process executed by the service providing system is stored. Here, the process indicated by the process 404 in the request-process correspondence information 120 and an identifier indicating an ID of an object in the target system 505 for performing the process are stored in the process 508. For example, when the process is "Server Creation", a value indicating an ID of a server is stored, and when the process is "Host WWN Setting", a value indicating an ID of a host WWN is stored.

When the process is an operation for a plurality of resources, a plurality of values indicating IDs are stored. For example, when the process is "Volume Server Setting", an ID of the server and an ID of the volume are stored.

When the process classification 405 of a process is Update, a content to be changed is also stored. For example, when the process is "Volume Setting Change", an ID of volume and a setting change content of changing a "Capacity" of the volume from 100 GB to 1 TB are stored.

In the process status 509, information indicating an execution status of the process 508 is stored, "Success" is stored when the execution of the process is successful, "Failed" is stored when the execution of the process is failed, and "Not Executed" is stored when the request is not executed.

In the process count 510, information indicating an execution count of the process 508 is stored. Here, "1" is stored in the process count 510 when the execution of the process 508 is successful at one time, and "2" is stored in the process count 510 when the process 508 fails at one time and a retry is performed at one time.

When an error occurs during the execution of the request and the process fails, the subsequent normal process is not performed, and "-" indicating that the process is not executed is stored in the process count 510.

In addition, since the rollback process is a process of undoing the processes until the normal process is successful, "-" indicating that the normal process is not executed is stored in the process count 510 even when the process number 506 of the failed normal process is the rollback process stored in the corresponding process number 507.

FIG. 6 is a diagram showing an example of a data structure of the error handling information 122 according to Embodiment 1.

The error handling information 122 stores an entry including an error code 601, an error classification 602, and a handling start condition 603.

In the error code 601, a code indicating a content of an error that may occur in the service providing system of the infrastructure 101 is stored. For example, as the code indicating the content of the error in the storage system 310 of the infrastructure 101, "OPERATION_TIMEOUT" indicating that the process is timeout, "TOO_MANY_RE-QUEST" indicating that a large amount of process requests are received and cannot be processed, and the like are stored.

In the error classification 602, a classification according to the content of the error indicated by the error code 601 is stored. For example, "TEMPORARY" indicating that the error is a temporary error, "INCONSISTENT WITH CON-FIGURATION" indicating that a content designated by the request is inconsistent with a state of the service providing system, "INTERNAL" indicating that some problems occur in the service providing system, and the like are stored.

In the handling start condition 603, information about which condition is satisfied when an error indicated by the error code 601 occurs to perform automatic handling is stored. When the condition is not satisfied, there is a high possibility that the error may occur again when the automatic handling is performed, and thus the automatic handling is not performed.

In the handling start condition 603, for example, "CPU<100%" indicating that a CPU usage rate of the infrastructure 101 is not 100%, "TRIAL COUNT<3" indicating that a trial count of the corresponding process is less than 3, "Resource Unlocked" indicating that a resource related to the error is not locked in the infrastructure 101, "WAIT TIME: 3 min" indicating that the automatic handling is performed after 3 minutes from the occurrence of the error, "REFRESH" indicating that the automatic handling is performed after a refresh operation, and "-" indicating that there is no condition are stored.

FIG. 6 shows an example of a condition when a retry handling is performed, as an example of the handling start condition 603.

Further, in the present embodiment, the condition when a rollback handling is performed is "CPU<100%", "TRIAL COUNT=1", and "Resource Unlocked", which are common to all error codes.

Here, the error handling information 122 may be used to manage the conditions when the rollback handling is performed. Specifically, a plurality of handlings (retry and rollback) and handling start conditions for the respective handlings may be stored for the same error code, and the invention is not limited thereto.

FIG. 7 is a diagram showing an example of a data structure of the process time information 123 according to Embodiment 1.

The process time information 123 stores an entry including a process 701, a target type 702, a unit process time 703, a unit value 704, and a calculation formula 705.

In the process 701, information that can specify a process executed by the service providing system of the infrastructure 101, such as an API name provided by the API (1) 312 of the storage system 310, is stored.

In the target type 702, a type of the service providing system in the infrastructure 101 that is an execution target of the process 701, for example, a storage system (storage) and an SDS, is stored. Here, the storage system (storage) and the SDS are managed as the target type 702, and the entry of the process time information 123 may be managed in a specific instance in a real environment instead of the target type 702, that is, in units of "Storage 1" and "Storage 2" instead of "Storage".

In the unit process time 703, information on a time taken when a process is performed on a unit stored in the unit value 704 is stored.

In the unit value 704, a unit value related to a capacity such as 1 GB or 1 MB is stored.

In the calculation formula 705, a formula for calculating a process time of the process 701 is stored.

Here, the unit process time 703, the unit value 704, and the calculation formula 705 may be obtained by any method based on information provided by a vendor providing the service providing system of the target type 702 using a manual, white paper, or the like, or based on an actual value when the process 701 is actually performed on the target type 702, and the invention is not limited thereto.

Although only the example of the process time for the single target type 702 is described here, the process time taken for an operation for a plurality of target types 702, specifically, the process time taken for a data copy operation such as backup from the storage system to the SDS may be described.

In addition, although the example of the formula in which only the capacity, the unit process time, and the number are variables is described as the calculation formula, other items may be variables. For example, information on system components such as a CPU, a memory, and a port of the storage system, a usage status of the information on these components in an actual environment, or information related to NW such as NW bandwidth and the number of switch connections between the storage system and the SDS may be used as variables, and the invention is not limited thereto.

Figure 8:
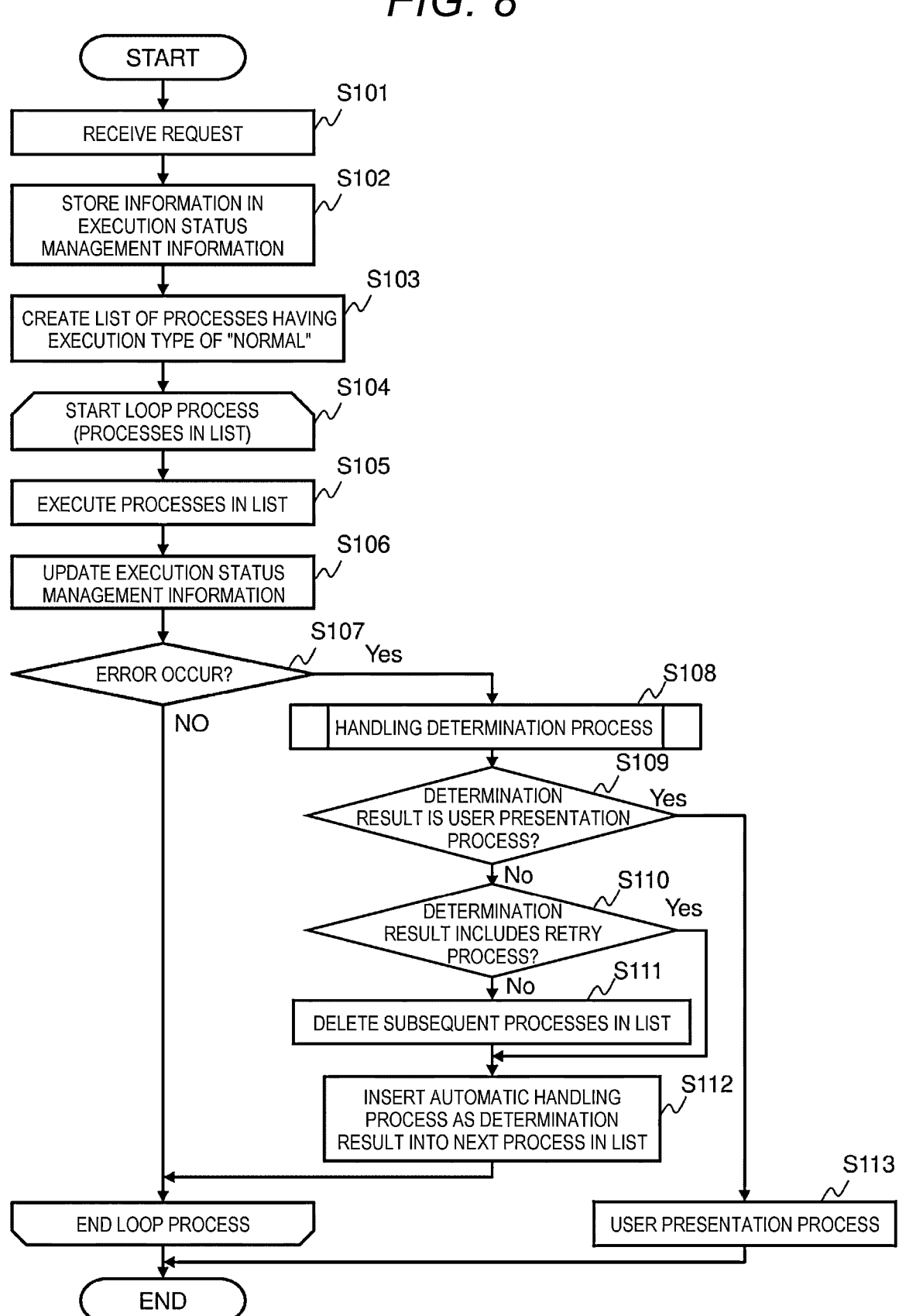
FIG. 8 is a flowchart showing an example of a request control process executed by the management system according to Embodiment 1.

FIG. 8 is a flowchart showing an example of a request control process executed by the management system 100 according to Embodiment 1.

The request control unit 110 receives a request to the infrastructure 101 (step S101). The request is received from the input device 203 by a user who uses the management system 100, or is transmitted from a client program (not shown) that accesses the management system 100 via the communication I/F 205.

Subsequently, an entry indicating the request received in step S101 is extracted from the request-process correspondence information 120, an object as a process target of the request is selected based on the configuration of the service providing system in the infrastructure 101, and information on the selected object and information including the ID 501 to be assigned to this request are stored in the execution status management information 121 (step S102).

Here, for the information on the object, for example, in the example of "Allocate Volume" shown in FIG. 4, objects including Storage as the target 403, and Server Creation, Host WWN Setting, Volume Creation, Path Setting, and Volume Server Setting as the process 404 are determined based on the configuration of the service providing system in the infrastructure 101. For example, it is determined to create a server whose identification information is "5".

Here, although the configuration of the service providing system such as the storage system is generally stored as configuration information and is thus not shown, the configuration information is information on the internal configuration (CPU, memory, ports, volumes, pools, disks, and the like) of a device, such as a server or a storage, present in the service providing system, and a connection relationship between the devices, such as servers and storages.

A method of extracting an object may be any method, and examples thereof include, but is not limited thereto, a method of creating a volume from a storage area having the largest capacity in the storage system 310, a method of setting a volume such that access can be made via a host WWN having the smallest number of used volumes, and a method of selecting a smallest empty number from numbers for objects that can be set by the device.

Next, in step S103, a list of processes having an execution type of "normal" is created based on the execution status management information 121 (step S103).

Next, a loop process of repeating the processes in S105 to S112 until all the processes in the list created in step S103 are completed is started (step S104).

In step S105, the processes in the list are executed in the order of the process number 506. Here, for example, the management system 100 executes "Server Creation" with the process number P1 in the infrastructure 101.

Next, based on an execution result of the processes in step S105, the execution status management information 121 is updated by storing the status 503 of the request, the error type 504 when an error occurs, the process status 509, and the process count 510 indicating how many times the process 508 is executed in the execution status management information 121 (step S106).

Next, whether an error occurs in the processes executed in S105 is checked (step S107).

When no error occurs in step S107, the process is successful. Therefore, the loop process is shifted to a process with the next process number 506, and the loop process is repeated until all processes in the list are completed.

When an error occurs in step S107, the process is failed, and thus, a handling determination request is transmitted from the request control unit 110 to the handling determination unit 111 to call out the handling determination process (step S108).

Next, it is determined whether a determination result of the handling determination process in step S108 is a user presentation process, as a handling, of presenting a handling procedure to a user without executing automatic handling (step S109).

In step S109, when the determination result of the handling determination process is not the user presentation process as a handling, it is determined whether the determination result of the handling determination process in step S108 includes a retry process of re-executing the process in which the error occurs (step S110).

In step S110, when the retry process is not included in the determination result of the handling determination process, the subsequent processes in the list are deleted (step S111), and the process proceeds to step S112.

In step S110, when the retry process is included in the determination result of the handling determination process, the process proceeds to step S112 without executing step S111.

In step S112, an automatic handling process as the determination result of the handling determination process (for example, a retry process, a rollback process, and a process in the handling start condition) is inserted into the next process in the list.

In step S109, when the determination result of the handling determination process is the user presentation process as a handling, it is determined that the automatic handling cannot be executed or is not to be executed in the handling determination process, so that the process of presenting the handling procedure to be performed by the user to the user is executed (step S113), and the present process ends.

When the request input by the user from the input device 203 is received in step S101, an error handling display screen presenting the handling procedure is created and displayed on the output device 204 in step S113. Details of the error handling display screen will be described later with reference to FIG. 10.

When a request is received from the client program in step S101, a response including the handling procedure is transmitted to the client program in step S113.

Figure 9:
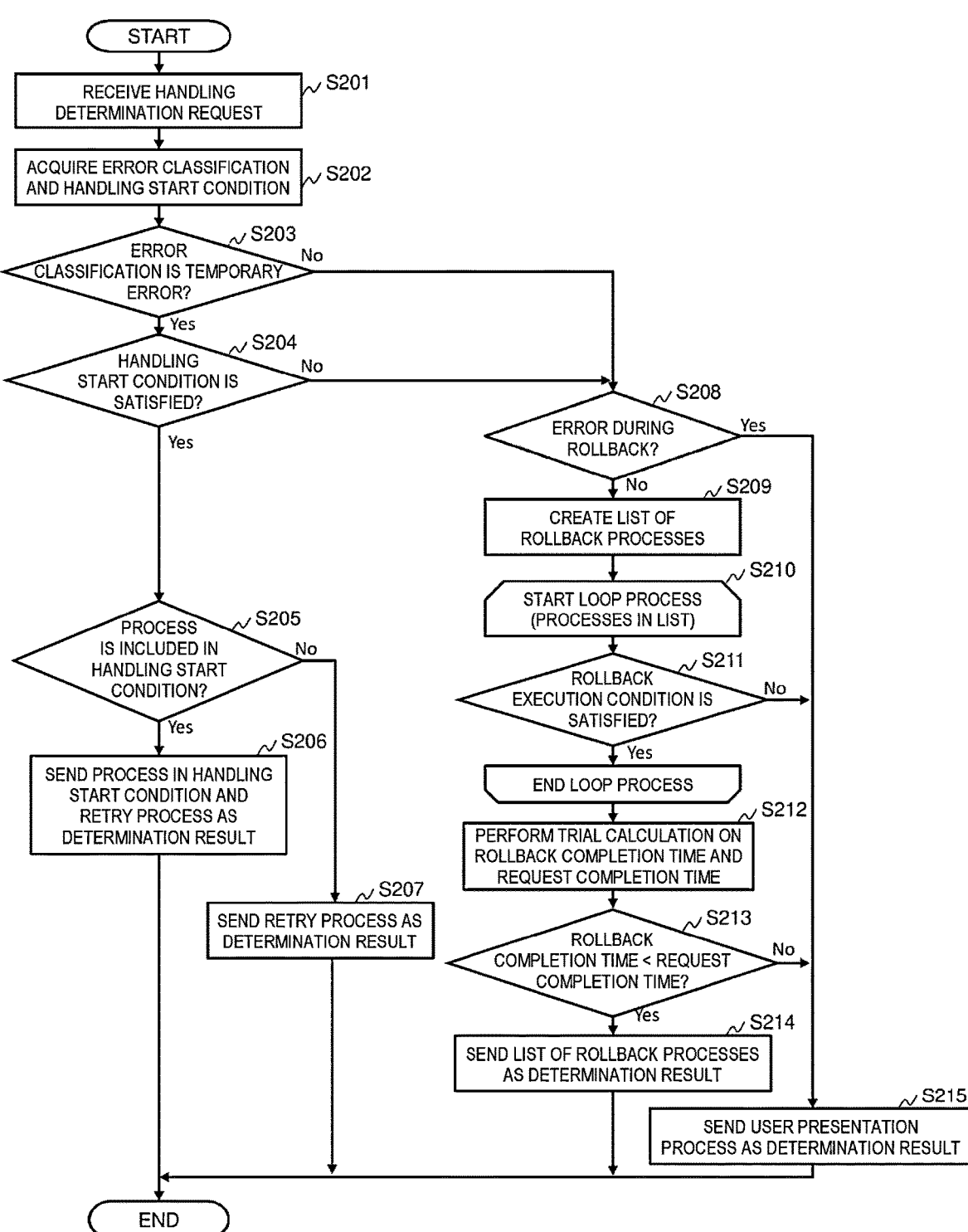
FIG. 9 is a flowchart showing an example of a handling determination process executed by the management system according to Embodiment 1.

FIG. 9 is a flowchart showing an example of the handling determination process executed by the management system 100 according to Embodiment 1.

The handling determination unit 111 receives a handling determination request from the request control unit 110 (step S201).

The handling determination unit 111 refers to the error handling information 122, and acquires the error classification 602 of an occurring error and the handling start condition 603 (step S202).

Subsequently, with reference to the error classification 602 acquired in step S202, it is determined whether the occurring error is a temporary error (step S203).

When the occurring error is a temporary error in step S203, it is determined whether the handling start condition 603 other than the process is satisfied among handling start conditions 603 for executing a retry process as a handling (step S204).

Here, in the case of checking whether there is a possibility that a failure occurs in the performance, the capacity, the configuration, or the like of the system components of the service providing system such as "CPU USAGE RATE<100%", performance information, capacity information, configuration information, or the like of the service providing system is referred to. These pieces of information are not shown since these pieces of information are general management information stored in the service providing system.

In addition, in the case of checking whether there is a possibility that a failure occurs due to the process execution status, such as whether the object as the target of the process is locked by another process, or whether the process execution of the service providing system is delayed due to a large number of processes being simultaneously executed, information on a process being executed in the service providing system is referred to. The information on the process is general management information in the service providing system managed under the name of job information or task information, and is not shown.

When the handling start condition 603 other than the process is satisfied in step S204, it is checked whether a process is included in the handling start condition 603 (step S205). The process mentioned here indicates, for example, a process of collecting the latest information of the device, such as "REFRESH", in the management system, but the invention is not limited thereto.

When the process is included in the handling start condition 603 in step S205, a process in the handling start condition 603 and a retry process are sent to the request control unit 110 as the handling determination result (step S206), and the present process ends.

When the process is not included in the handling start condition in step S205, a retry process is sent to the request control unit 110 as the handling determination result (step S207), and the present process ends.

When the occurring error in step S203 is not a temporary error, and when the handling start condition 603 other than the process is not satisfied in step S204, it is determined that a possibility of the error occurring again during the execution of the retry process is high. Therefore, the retry is not performed, and it is determined whether the occurring error is an error during a rollback (step S208).

When the occurring error in step S208 is not an error during the rollback, the execution status management information 121 is referred to extract a rollback process with a corresponding process number same as the process number of the last normal process having the process status 509 being "Success", and a list of rollback processes after the rollback process is created (step S209).

Next, a loop process of repeating the process in S211 until all the rollback processes in the list created in step S209 are completed is started (step S210).

In step S211, it is determined whether a preset condition for executing a rollback handling is satisfied.

Here, as described above, the condition for executing the rollback handling is "CPU<100%", "TRIAL COUNT=1", and "Resource Unlocked", which are common to all the error codes. By checking whether these conditions are satisfied, it is possible to determine whether the possibility of the occurrence of the error during the rollback is high.

The condition for executing the rollback handling may be a condition other than the above, and the invention is not limited thereto.

In addition, different conditions may be provided for service providing systems of infrastructures as the condition for executing the rollback handling. This is because the usage status and specifications of resources such as a CPU are different among service providing systems (for example, storage systems and SDSs) provided by the respective infrastructures.

In this case, it may be determined that the storage system can perform the rollback, but the SDS cannot perform the rollback. Therefore, for all the processes in the list for any service providing system, when the determination in step S211 is "No", the process for the corresponding service providing system may be a rollback, and for example, when the determination in step S211 is divided into "Yes" and "No" for the processes in the list, the process for the corresponding service providing system may not be a rollback.

When it is determined that the condition for executing the rollback handling is satisfied for all the processes in the list in step S211, a time taken to return to a state before the request execution and a time taken to execute continuous processes from the process in which the error occurs in the request are subjected to trial calculation (step S212). Here, the trial calculation is performed based on the calculation formula 705 in the process time information 123. Specifically, the information received in the request is set for the capacity and the number in the calculation formula, and the trial calculation is performed.

Subsequently, in step S213, a rollback completion time taken to return to the state before the request execution and a request completion time taken to execute the processes after the process in which the error occurs in the request are subjected to the trial calculation and compared with each other.

When the request completion time is longer than the rollback completion time in step S213 (Yes in step S213), the list of the rollback processes created in step S209 is sent to the request control unit 110 as a determination result (step S214), and the present process ends.

Here, regarding the trial calculation of the rollback completion time and the request completion time, the rollback completion time and the request completion time may be calculated by using a time obtained by adding up single process times for respective processes according to a restriction of the service providing system or the like, or may be calculated, for a process that can perform parallelization, by using a time obtained by subtracting a process time corresponding to the parallelization and adding up the time.

For example, when calculating the rollback completion time and the request completion time of the request including the process to the infrastructure (1) and the process to the infrastructure (2), the process on an infrastructure (1) side and the process on an infrastructure (2) side are executed in parallel independently in many cases, and thus the time is calculated in consideration of the execution time.

When it is determined that the occurring error is an error during the rollback in step S208, when the condition for executing the rollback handling is not satisfied in step S211, and when the request completion time is shorter than the rollback completion time in step S213, the automatic handling is not executed, the process is suspended, the user presentation process of presenting the handling procedure to be performed by the user to the user is sent to the request control unit 110 as the handling determination result (step S215), and the present process ends.

In FIG. 9 in the present embodiment, the retry is selected with the highest priority as an error handling, the rollback is selected if the retry is difficult to be performed, and the presentation of the handling procedure to the user is selected if the rollback is also difficult to be performed, whereby the error handling can be easily performed.

Here, a "retry priority policy", a "rollback priority policy", a "user presentation priority policy", a "rollback and retry candidate selection policy", a "cost priority policy", an "operation completion time priority policy", and the like may be set in advance as policies, and the error handling may be selected according to the set policies.

For example, when the "rollback priority policy" is set, after step S202 in FIG. 9 is executed, the process proceeds to step S208, and the rollback or the user presentation is performed.

In addition, when the "user presentation priority policy" is set, after step S202 in FIG. 9 is executed, the process proceeds to step S215, and the user presentation is performed.

When the "rollback and retry candidate selection policy" is set, the user is caused to select either the rollback or the retry.

In addition, when the "cost priority policy" is set, a process with less cost is prioritized. For example, when the process classification 405 is "Create", the rollback is prioritized, and when the process classification 405 is "Delete", the retry is prioritized, whereby the operation is performed in a direction of deleting or reducing the resource. This is particularly effective in a case where leaving resources such as SDS on a public cloud leads to a large amount of cost.

In addition, when the "operation completion time priority policy" is set, the time taken for the automatic handling is subjected to the trial calculation, and a process in which the time until the operation completion is shorter is prioritized.

According to the present process, when it is determined that the possibility of the occurrence of the error is high in the case of executing the retry, the rollback is executed or the handling procedure is presented to the user, and thus it is possible to prevent the error handling from being prolonged due to the occurrence of the error during the retry and to optimize a time until a management operation is completed.

In addition, when it is determined that the possibility of the occurrence of the error is high in the case of executing the rollback, the handling procedure is presented to the user without executing the rollback, and thus it is possible to prevent the error from being more complicated due to the occurrence of the error during the rollback.

When the rollback completion time is longer than the request completion time, the handling procedure is presented to the user without executing the rollback, and thus the error handling can be quickly performed.

FIG. 10 is a diagram showing an example of the error handling display screen presented by the management system 100 according to Embodiment 1.

An error handling display screen 2000 is an example of the error handling display screen displayed on the output device 204 in step S113 in FIG. 8.

The error handling display screen 2000 displays error information 2001 and a handling procedure 2002.

The error information 2001 includes the ID 501 of the request in which the error occurs, the request 502, the error code 601, a date and time when the error occurs, and an error message defined in advance corresponding to the error code.

In the handling procedure 2002, a handling procedure to be performed by the user is presented in order to handle the error occurred. Here, as an example, an example in which the user is instructed to perform the deletion of the host WWN and the deletion of the server is shown.

Here, an example in which only the procedure of manually performing the rollback is presented as the handling procedure 2002 is shown, but only a procedure of manually advancing the process may be presented, or both the procedures may be presented.

When both the rollback procedure and the procedure of advancing the process are presented, information serving as a criterion for determining which procedure the user should select may also be presented. The information includes, for example, information on the rollback completion time and the request completion time obtained in step S212 in FIG. 9, information on the cost of leaving the resource without deleting the resource (particularly, in the case of the service management system using a public cloud resource), and information on items causing an adverse effect on the process execution obtained in steps S204 and S211. In addition, these pieces of information may be collectively presented by assigning a priority, or the like.

In this manner, by referring to the information displayed on the error handling display screen 2000, the user can easily handle the error during the request execution. In addition, cost management is facilitated by presenting the cost information on the error handling display screen 2000.

The invention is not limited to the embodiments described above, and includes various modifications. For example, the embodiments described above are described in detail to facilitate understanding of the invention, and the invention is not necessarily limited to those including all the described configurations. A part of a configuration in the embodiments may be added to, deleted from, or replaced with another configuration.

A part or all of the configurations, functions, processing units, processing methods, and the like described above may be implemented by hardware by, for example, designing with an integrated circuit.

The invention can also be implemented by a program code of software for implementing the functions of the embodiments. In this case, a storage medium storing the program code is provided in a computer, and a processor provided in the computer reads the program code stored in the storage medium. In this case, the program code read from the storage medium implements the functions of the embodiments described above by itself, and the program code itself and the storage medium storing the program code implement the invention. Examples of the storage medium for supplying such a program code include a flexible disk, a CD-ROM, a DVD-ROM, a hard disk, a solid state drive (SSD), an optical disk, a magneto-optical disk, a CD-R, a magnetic tape, a nonvolatile memory card, and a ROM.

Further, the program code for implementing the functions described in the embodiments can be implemented in a wide range of programs or script languages such as an assembler, C/C++, Perl, Shell, PHP, Python, and Java (registered trademark).

Further, the program code of the software for implementing the functions of the embodiments may be distributed via a network to be stored in a storage unit such as a hard disk or a memory of a computer or a storage medium such as a CD-RW or a CD-R, and a processor provided in the computer may read and execute the program code stored in the storage unit or the storage medium.

Control lines and information lines considered to be necessary for description are illustrated in the embodiments described above, and not all control lines and information lines in a product are necessarily illustrated. All the configurations may be connected.

What is claimed is:

1. A management system that manages one or more infrastructures, the management system comprising:
a processor,
wherein the processor:
executes a plurality of consecutive processes on the infrastructure in response to a request;
determines whether an error occurs during execution of the plurality of consecutive processes;
selects a handling based on at least one of a classification of the error, an execution status of the processes, and a preset handling start condition when the error occurs;
executes the selected handling,
wherein, when the classification of the error is temporary, the processor selects a retry for re-executing a process in which the error occurs, and
wherein, when the classification of the error is not temporary, the processor selects a rollback for returning to a state before the execution of the plurality of consecutive processes, or selects a suspension in a state during the execution of the plurality of consecutive processes, performs, when the error occurs, trial calculation on a rollback completion time taken for the rollback and a request completion time taken for executing a process subsequent to the process in which the error occurs in the plurality of consecutive processes and compares the rollback completion time with the request completion time; and selects the handling based on a result of the comparison.

2. The management system according to claim 1, wherein the processor further:

selects the rollback when the rollback completion time is shorter than the request completion time as the result of the comparison; and selects the suspension when the rollback completion time is longer than the request completion time as the result of the comparison.

3. The management system according to claim 1, wherein the handling start condition includes a state of the infrastructure, and when it is determined that the handling is executable based on the handling start condition, the processor selects the handling.

4. The management system according to claim 1, wherein when the suspension is selected, the processor presents a handling procedure to be performed by a user to the user.

5. The management system according to claim 1, wherein the processor selects the handling according to a preset priority order.

6. The management system according to claim 5, wherein the priority order includes at least one of a retry priority, a rollback priority, a user presentation priority, a candidate selection, an operation completion time priority, and a cost priority.

7. A management method of a management system that manages one or more infrastructures, the management method comprising:

by a processor included in the management system:

executing a plurality of consecutive processes on the infrastructure in response to a request;

determining whether an error occurs during execution of the plurality of consecutive processes;

selecting a handling based on at least one of a classification of the error, an execution status of the processes, and a preset handling start condition when the error occurs;

executing the selected handling, wherein, when the classification of the error is temporary, the processor selects a retry for re-executing a process in which the error occurs, and wherein, when the classification of the error is not temporary, the processor selects a rollback for returning to a state before the execution of the plurality of consecutive processes, or selects a suspension in a state during the execution of the plurality of consecutive processes, performing, when the error occurs, trial calculation on a rollback completion time taken for the rollback and a request completion time taken for executing a process subsequent to the process in which the error occurs in the plurality of consecutive processes and compares the rollback completion time with the request completion time; and selecting the handling based on a result of the comparison.

* * * * *